July 21, 1953 H. M. SWIFT 2,646,272
VEHICLE MOUNTED HYDRAULIC SCALE FOR LOAD CARRYING VEHICLES
Filed Jan. 29, 1952 2 Sheets-Sheet 1

INVENTOR.
HARLEY M. SWIFT,
BY
McMorrow, Berman + Davidson
ATTORNEYS.

July 21, 1953  H. M. SWIFT  2,646,272
VEHICLE MOUNTED HYDRAULIC SCALE FOR LOAD CARRYING VEHICLES
Filed Jan. 29, 1952  2 Sheets-Sheet 2
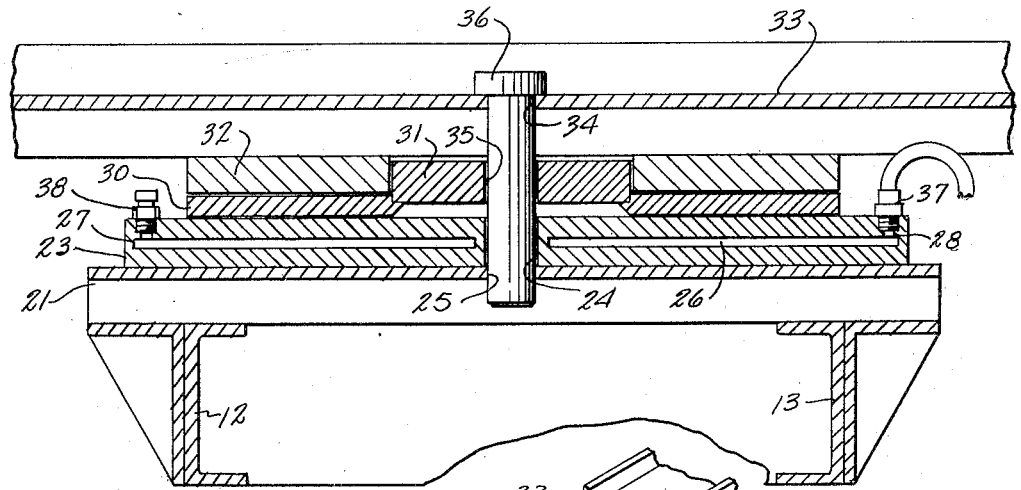
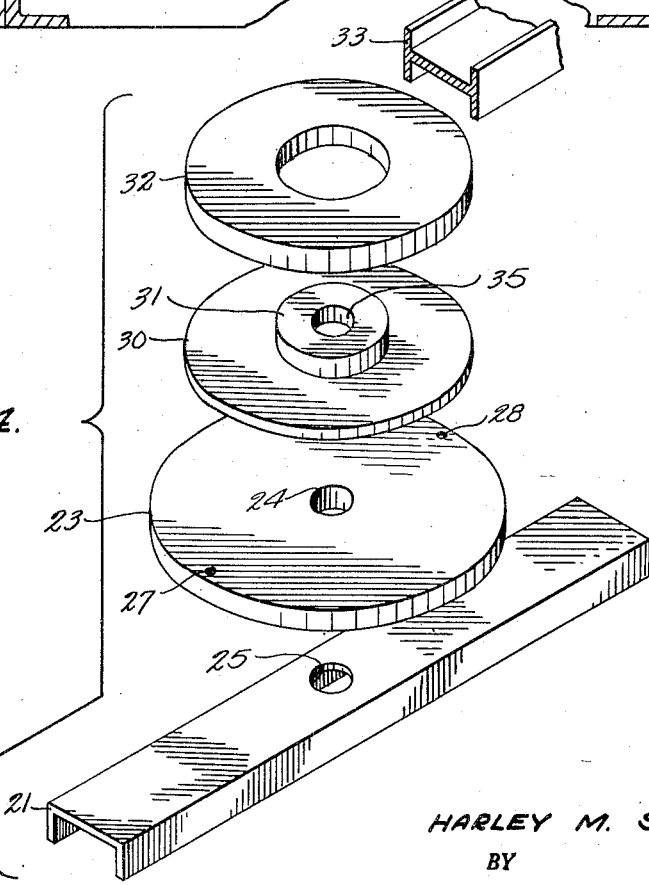
INVENTOR.
HARLEY M. SWIFT,
BY
McMorrow, Berman & Davidson
ATTORNEYS.

Patented July 21, 1953

2,646,272

UNITED STATES PATENT OFFICE 2,646,272

VEHICLE MOUNTED HYDRAULIC SCALE FOR LOAD CARRYING VEHICLES

Harley M. Swift, Oregon City, Oreg.

Application January 29, 1952, Serial No. 268,723

2 Claims. (Cl. 265—40)

This invention relates to vehicle carried scales for load carrying vehicles to indicate the weight of a load placed on the vehicle and more particularly to a hydraulic scale which indicates the load thereon by means of a hydraulic pressure gauge.

It is among the objects of the invention to provide an improved weighing scale which can be permanently mounted on a vehicle, such as a load carrying truck or tractor truck, and subjected to the load on the truck or on a trailer connected to a tractor truck; which is continuously subject to the load and will indicate the weight of the load while the vehicle is being loaded; which can be used in multiple to indicate the loads on a tractor vehicle and one or more trailer vehicles and is not subject to damage by the loads placed thereon; which can be mounted under the fifth wheel of a tractor truck, if desired, to indicate the weight of the front end of a semitrailer; and which is simple and durable in construction, economical to manufacture, and positive, accurate and effective in operation.

Other objects and advantages will become apparent from a consideration of the following description and the appended claims in conjunction with the accompanying drawings wherein:

Figure 3 is a cross sectional view on an enlarged scale on the line 3—3 of Figure 2; and Figure 4 is an exploded perspective view of the load weighing scale.

Figure 1:
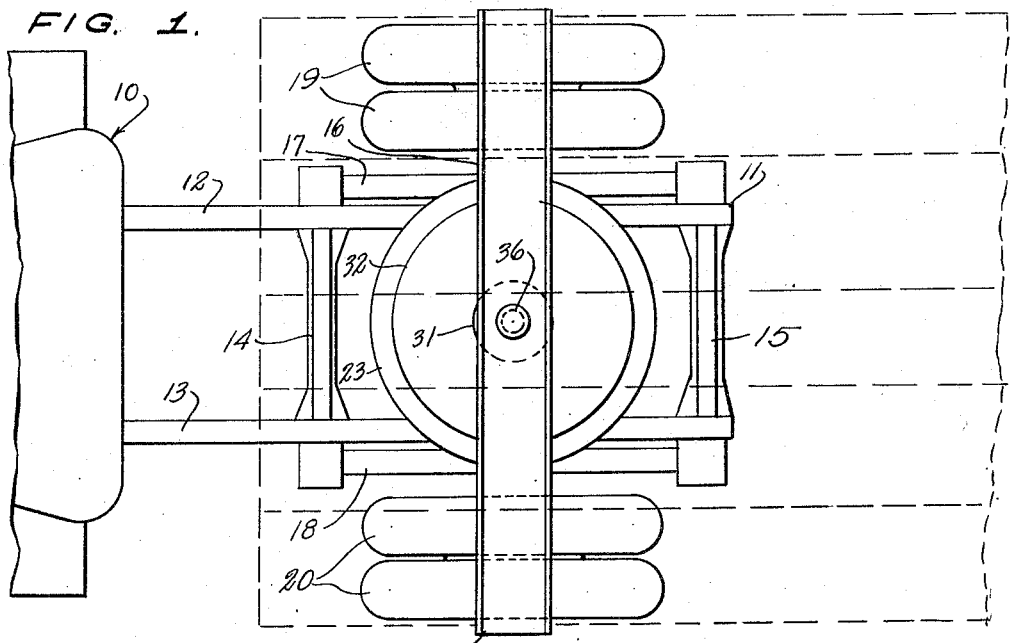
Figure 1 is a fragmentary top plan view of a tractor truck with a load weighing scale illustrative of the invention operatively mounted thereon.
Figure 2:
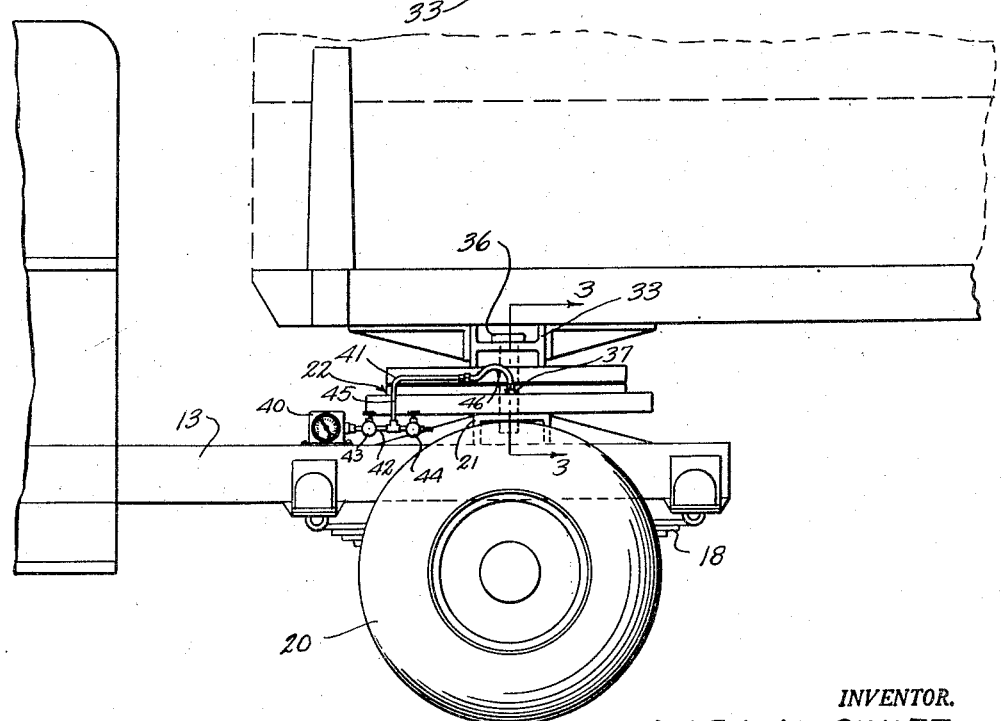
Figure 2 is a side elevational view of the truck and scale illustrated in Figure 1.

With continued reference to the drawings, the numeral 10 generally indicates a load carrying vehicle, in this case, a tractor truck, having a frame 11 including frame side members 12 and 13 and cross members 14 and 15, a frame carrying rear axle 16 extending transversely of the frame between the cross members 14 and 15 and supporting the frame by means of the springs 17 and 18 and rear driving wheels 19 and 20 mounted on the axle 16 at the respectively opposite ends of the latter.

A cross member 21 of channel shaped cross section extends transversely of the frame between the cross members 14 and 15 and is mounted in inverted position on the upper surfaces of the frame side members 12 and 13. The scale, generally indicated at 22, and particularly illustrated in Figures 3 and 4, comprises a circular or disc shaped body 23 having flat and substantially parallel side surfaces and formed of a suitable resilient material, such as tempered steel. This body 23 is mounted at its lower side on the upper surface of the channel shaped cross member 21 in a manner such that it projects to substantially equal extent to the opposite sides of the cross member and is preferably welded to the cross member. This body has a centrally disposed aperture 24 extending therethrough and registering with an aperture 25 in the cross member 21 and has a flat annular chamber 26 therein surrounding and spaced from the aperture 24 with its outer edge spaced from the peripheral surface of the body 23. The chamber 26 is substantially concentric of the body 23 and the body is provided with apertures 27 and 28 which extend from the chamber 26 to the exterior surface of the body at spaced apart locations, these apertures preferably being spaced at diametrically opposed locations in the upper surface of the body 23.

While the dimensions of the body 23 may be varied within practical limits without, in any way exceeding the scope of the invention, such a body giving satisfactory results in one installation has a diameter of approximately twenty inches, a thickness of approximately one and one eighth inch, the chamber 26 being approximately one eighth of an inch thick and the walls of the body at the opposite sides of the chamber being approximately one half inch thick, and a central aperture 24 of one and three quarter inch diameter extending therethrough, the chamber 26 being spaced approximately one inch from the central aperture and from the peripheral surface of the body.

A first or primary pressure plate 30 of annular shape is mounted on the side of the body 23 remote from the cross member 21, which is the normally top side of the body 23, concentrically of the body and is preferably permanently secured to the body by suitable means, such as welding. In the example indicated above, this primary pressure plate has a thickness of approximately one half inch, a diameter of approximately sixteen inches and has a central opening of a diameter of approximately six inches.

A collar 31 is disposed in the central opening in the pressure plate 30 and is in the form of a circular disc having flat sides and a central aperture extending therethrough. This collar is welded to the pressure plate 30 with its side adjacent the top surface of the body 23 spaced from the top surface and projects above the top surface of the pressure plate. In the example set forth above, this collar is approximately one inch thick, six inches in diameter, and has a central aperture of one and three quarters inch diameter.

A second or auxiliary pressure plate 32 is mounted on the top surface of the pressure plate 30 for free rotational movement relative to the latter and is of annular shape having a diameter substantially equal to the diameter of the pressure plate 30, a central aperture therein having a diameter slightly greater than the diameter of the collar 31 and a thickness slightly greater than the extent to which the collar 31 projects above the top surface of the primary pressure plate 30. A load supporting structure 33, such as a log bunk or the portion of a fifth wheel attached to a semitrailer is mounted on the auxiliary pressure plate 32 and permanently secured to the top surface of this pressure plate by suitable means, such as being welded thereto.

The load supporting structure 33 has an aperture 34 therein which registers with the aperture 35 in the collar 31 and with the apertures 24 and 25 in the body 23 and cross member 21 and a kingpin 36 extends through these registering apertures to pivotally connect the load supporting structure 33 to the cross member 21 mounted on the vehicle.

A tube coupling 37 is mounted in the aperture 28 in the body 23 and an air bleed valve 38 is mounted in the aperture 27 for bleeding air from the chamber 26. A fluid pressure gauge 40 is mounted on the frame of the vehicle 10 and a tubular conduit, generally indicated at 41, connects the pressure gauge to the fluid coupling 37. In the arrangement illustrated, the conduit 41 includes a portion 42 extending from the pressure gauge 40 and having valves 43 and 44 connected therein, an angular portion 45 connected at one end to the portion 42 between the valves 43 and 44 and a flexible portion 46 connecting the other end of the portion 45 to the coupling 37.

The valve 43 is a cut-off valve for disconnecting the pressure gauge 40 from the body 23 under some conditions of loading wherein heavy objects are dropped on the load supporting structure 33 and the impact of these heavy bodies might damage the pressure gauge. The valve 44 is also a cut-off valve and disposed near the end of the conduit portion 42 remote from the pressure gauge 40, so that it can be opened to permit hydraulic fluids being forced into the chamber 26 and the conduit 41 through the adjacent end of the conduit portion 42. The air bleed valve 38 is effective to bleed any air from the chamber 26 while the latter is being filled with hydraulic fluid.

The body 23 may conveniently be manufactured by first forming it in two separate pieces of steel and then permanently welding the two pieces together with the chamber 26 included therebetween.

In using the device, the pressure gauge 40 is first preferably calibrated by placing weights of known value on the load supporting structure 33 and noting the indicated pressure on the gauge. If desired, a special dial may be prepared for the gauge reading directly in pounds or tons, so that the operator can read the weight of the load on the adjacent axle directly at any time. The chamber 26 and conduit 41 will, of course, be maintained filled with hydraulic fluid at a predetermined pressure and the increase in the fluid pressure occasioned by contraction of the volume of the chamber 26 when the body 23 is subjected to load will give an accurate indication of the weight of the load.

A similar scale may be mounted on each vehicle of a train of vehicles including a tractor and one or more trailer vehicles or a scale may be mounted over each load carrying axle of a single vehicle or a train of vehicles, if it is necessary to know the loading of each axle, the known tare on each axle, of course, being added to the weight of the load imposed thereon as indicated by the corresponding scale.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a load carrying vehicle, a weighing scale comprising a disc shaped body of resilient material having flat and substantially parallel side surfaces mounted at one side on said vehicle and having a centrally disposed aperture extending therethrough and a flat annular chamber therein circumspatially surrounding said aperture, an air bleed valve mounted on said body and communicating with said chamber, a tube fitting mounted on said body at a location spaced from said air bleed valve and communicating with said chamber, a fluid pressure gauge mounted on said vehicle, a tubular conduit connecting said tube fitting to said pressure gauge, a body of hydraulic fluid filling said chamber and said conduit, a first pressure plate of annular shape, secured on said body at the side of the latter remote from said vehicle and circumspatially surrounding the aperture in said body, a collar disposed in the opening in said first pressure plate and secured to the latter, said collar having a central aperture therein and projecting from the side of said first pressure plate remote from said body with its surface adjacent said body spaced from the latter, a second pressure plate of annular shape rotatably mounted on said first pressure plate in surrounding relationship to said collar, a work supporting structure secured on said second pressure plate and having an aperture therein registering with the apertures in said collar and said body, and a kingpin extending through said registering apertures to couple said work supporting structure to said vehicle.

2. In combination with a load carrying vehicle, a weighing scale comprising a disc shaped body of resilient material having flat and substantially parallel side surfaces mounted at one side on said vehicle and having a centrally disposed aperture extending therethrough and a flat annular chamber therein circumspatially surrounding said aperture, an air bleed valve mounted on said body and communicating with said chamber, a tube fitting mounted on said body at a location spaced from said air bleed valve and communicating with said chamber, a fluid pressure gauge mounted on said vehicle, a tubular conduit connecting said tube fitting to said pressure gauge, a body of hydraulic fluid filling said chamber and said conduit, a first pressure plate of annular shape secured on said body at the side of the latter remote remote from said vehicle and circumspatially surrounding the aperture in said body, a collar disposed in the opening in said first pressure plate and secured to the latter, said collar having a central aperture therein and projecting from the side of said first pressure plate remote from said body with its surface adjacent said body spaced from the latter, a second pressure plate of annular shape rotatably mounted on said first pressure plate in surrounding relationship to said collar, a work supporting structure secured on said second pressure plate and having an aperture therein registering with the apertures in said collar and said body, a kingpin extending through said registering apertures to couple said work supporting structure to said vehicle, and a cross member extending diametrically across said one side of said body and secured to the latter and secured to said vehicle, said cross member having an aperture therein receiving said kingpin.

HARLEY M. SWIFT.

References Cited in the file of this patent

UNITED STATES PATENTS

| Number | Name | Date |
|---|---|---|
| 2,365,589 | Poston et al. | Dec. 19, 1944 |
| 2,592,501 | Williams | Apr. 8, 1952 |

FOREIGN PATENTS

| Number | Country | Date |
|---|---|---|
| 398,687 | Great Britain | Sept. 21, 1933 |